Aug. 21, 1928.
S. M. PINELES
1,681,193
DOG RACING APPARATUS
Filed Sept. 26, 1927
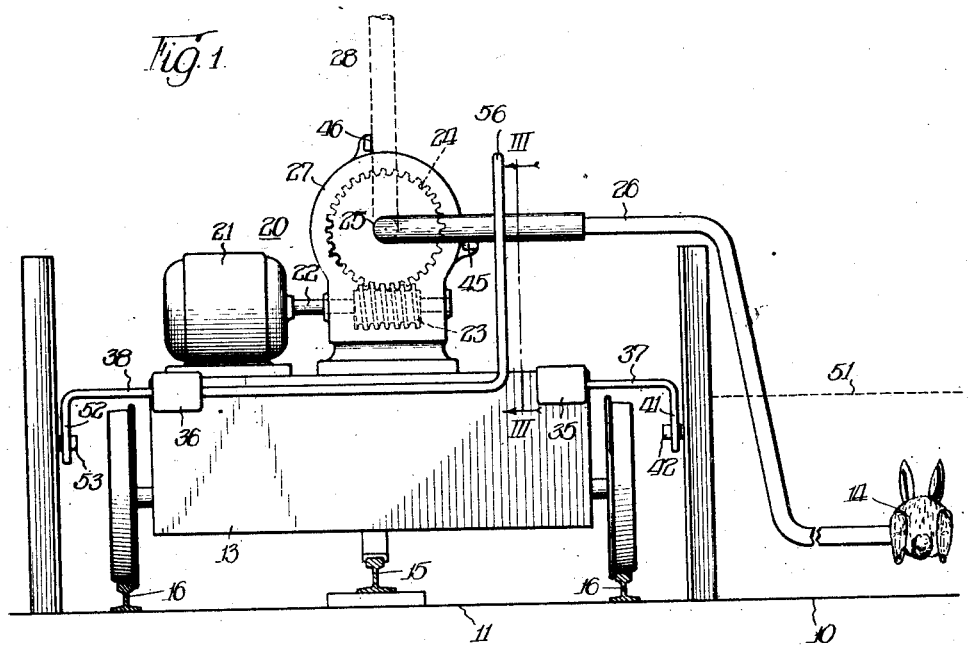
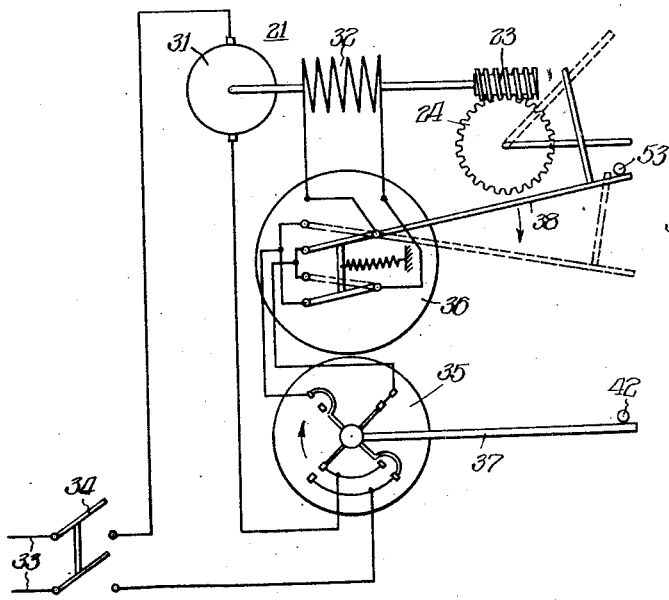
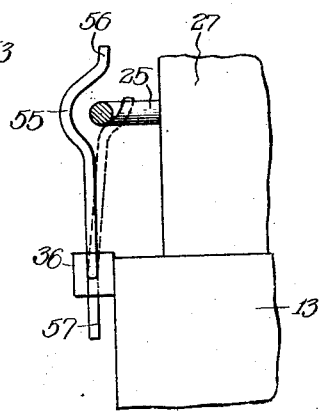
Witness:
R. Burkhardt
Inventor:
Solomon M. Pineles,
By Cromwell, Greist & Warden
Attys.

Patented Aug. 21, 1928.

1,681,193

UNITED STATES PATENT OFFICE.

SOLOMON M. PINELES, OF CHICAGO, ILLINOIS, ASSIGNOR TO HARRY B. STAVER.

DOG-RACING APPARATUS.

Application filed September 26, 1927. Serial No. 221,865.

This invention relates to dog racing apparatus and has among its objects the provision of an improved mechanism for imparting to the artificial lure carried in front of the dogs a jumping or hurdling movement and for bringing the lure either to an operative or an inoperative position.

In the accompanying drawings

Fig. 1 is a transverse section through a dog racing track with a view of the lure carriage on the track;

Fig. 2 is a diagram of the motor mechanisms for moving the lure towards and away from the racing ground, with the associated circuit connections and control switches and Fig. 3 is a detailed elevational view of a portion of the lure arm support and its cooperative relationship to the lure motor control switch taken along the lines III—III, Fig. 1.

Referring to the drawing, a dog racing track 10 in the form of an oval pathway has arranged alongside thereof a rail track 11 having running thereon a vehicle 13 constituting a lure carriage for propelling a lure 14 in front of the dogs to induce the same to run along the track 10. The lure carriage 13 is driven by means of suitable electric motors mounted therein, current being supplied to said motors by means of a third rail 15 and the running rail 16.

Mounted on the carriage there is a special lure-lifting mechanism 20 comprising a distinct electric motor 21 designated hereinafter as a lure-lifting motor. The lure-lifting motor 21 has a driving shaft 22 carrying a worm 23 which drives a worm wheel 24, to which in turn is coupled a shaft 25 that supports a lure arm 26, on the end of which is carried the aforementioned lure 14. The worm 23 and the worm wheel 24 are suitably journaled and supported in a casing 27 that is fixedly secured to the body of the carriage 13. Depending on the direction of rotation of the shaft 22 the lure arm 26 will be rotated either upwardly or downwardly. When the lure arm is in lower position, as indicated by the full lines in the drawing, the lure 14 will be held in operative position near the track 10, in front of the dogs. When the lure arm 26 is rotated by the worm wheel 24 in upward direction to the vertical position indicated by the dotted line 28, the lure 14 will be brought into upper inoperative position out of reach of the dogs. The electric motor 21 is so arranged as to permit reversal of the direction of rotation thereof through the control of its energizing circuits. In the arrangement shown in the drawing, the motor is of the direct-current series type and comprises a commutator armature 31 and a series field winding 32. The armature 31 and the field winding 32 are adapted to be supplied by a current from suitable conductors disposed along said track, for instance, by being connected in parallel to the driving motor of the carriage 13 through a pair of conductors 33, an auxiliary cutout switch 34 serving to cut off the supply to the lure-lifting motor.

In order to secure the desired operation of the motor in either one or the other direction, the connections between the armature 31 and the field winding 32 are controlled by means of a pair of reversing switches 35 and 36. The first reversing switch 35 is of the snap type and is arranged to reverse the connections of the field winding 32 with relation to the armature 31 each time the projecting switching arm 37 is swung in a particular direction indicated by the arrow 38, the arm returning to its normal position. The constructional arrangement of such switches does not constitute the subject of the present invention and will not be described, such switches being familiar in the art.

The second reversal switch 36 is of the oscillatory type and causes reversal of the connection of the field winding 32 with respect to the armature 31, whenever the operating arm 38 thereof is swung from its full line position shown in the drawing to its dotted line position 28. The oscillatory switch 36 is preferably so constructed that it will not occupy any intermediate position but will move only to its final end positions shown by full and dotted lines of the arm 38 whenever actuated from one or the other positions. Disregarding for the present the oscillatory switch 36 and considering only the snap switch 35 its arrangement on the vehicle 13 appears from Fig. 1, the operating arm 37 thereof having a cranked projecting end portion 41 adapted to engage the projections or cams 42 suitably supported along the track 11 in the path of the arm 41. Each time when the arm 41 meets such projection the snap switch 37 will move forward to its next position, producing a reversal of the connections between the field winding 32 and the armature 31.

In order to cause the lure to be carried on the track in front of the dogs, the lure carriage 13 is suitably energized and propelled along the rail 14 and the snap switch 35 is actuated, either manually or by a cam along the track to establish motor connections to the lure-lifting motor 21 in which the motor will rotate the shaft 22 in a direction at which the lure arm 26 will be moved downwardly, until the arm comes against a suitable stop, for instance, as indicated at 45 in Fig. 1. At the end of the stretch over which the race is held, a suitable cam projection along the track may be arranged which will again move the actuating arm 37 of the snap switch 35 to bring the snap switch 35 to its next successive position, reversing the connections of the field winding 32 and causing the motor 21 to rotate the shaft 22 in a direction at which the lure arm 26 will be swung upwardly to the vertical position until it is brought to a stop indicated, for instance, at 46.

The driving connection between the motor 21 and the lure arm 26 is unidirectional and non-reversible, that is, when no power is supplied by the motor 21 to the shaft 22 the lure arm 26 will be held stationary by the engagement of the gear wheel 24 with the worm 23, it being possible only to transmit movement from the motor to the lure arm and not from the arm to the motor shaft 22.

The above described arrangement constitutes a very convenient and simple means for imparting to the lure 14 a movement in imitation of a rabbit jumping over a hurdle disposed at a point of the track indicated, for instance, at 51 in Fig. 1. To this end there is provided along the track at a point somewhat in front of the hurdle a cam projection for actuating the snap switch 35 to reverse the motor connections so as to cause the lure arm 26 to be raised by the motor 21, the distance from the cam projection to the hurdle being so chosen as to give sufficient time to the motor 21 to have lifted the lure 14 somewhat above the hurdle so as to clear the same. A second similar cam projection also disposed along the track is then arranged to again actuate the snap switch 35 for producing a further reversal of the motor connections, thereby causing the motor to reverse its movement and to return the lure arm 26 to its downward position in which it was at the moment when it was caused to be lifted for clearing the hurdle.

While the snap switch 35 may thus be used for moving the lure arm between the operative and inoperative positions as well as to produce the hurdling movement thereof, I prefer to use a separate control switch for actuating the motor 21 to cause the hurdling movement of the lure, using the snap switch 35 only for bringing the arm from the operative to the inoperative position, and vice versa. The aforementioned oscillatory switch 36 is intended as an illustration of one type of arrangement for controlling the hurdling movement of the lure. In accordance with the invention, the switch 36 is so arranged and interlocked with the lure-moving mechanism that on being actuated by a suitable cam projection on the track at the point in front of the hurdle the switch 36 will reverse the connections of the motor 21 and cause the motor to rotate the shaft 22 in a direction at which the lure is lifted until it clears the hurdle; and upon reaching the height at which the lure clears the hurdle the lure mechanism actuates the switch 36 to effect a further reversal of the motor connections, thereby causing the motor 21 to return the lure arm downwardly to its normal operating position. With such arrangement of a hurdling switch 36 only one cam projection is required at a point somewhat in front of the hurdle to initiate the hurdling movement of the motor 21, the mechanism on the carriage in itself automatically causing return of the arm 26 as soon as it has cleared the hurdle without requiring further actuation from cams along the track. In the arrangement shown in the drawing the hurdling switch 36 is shown disposed on the side of the carriage opposite the main lifting switch 35 described above, although any other convenient arrangement could be used instead. The operating arm of the switch 36 has a crank portion 52 adapted to be engaged by a suitable cam projection 32 mounted and supported along the track at a point where the hurdling movement is to be initiated, thereby throwing the switch into the position where it establishes motor connections in which the lure arm is lifted by the motor. This position of the switch arm is indicated in the diagram, Fig. 2, by the dotted line 38'. In order to secure subsequent automatic reversal of the motor connections when the lure arm has been lifted to a height sufficiently to clear the hurdle, the switch arm 38 is provided with an additional cam portion 56 adapted to come into the path of the upwardly moving lure arm 26 whenever the switch arm 38 is thrown to the dotted line position. Accordingly, the cam portion 56 upon being engaged by the upwardly moving lure arm 26 will cause the arm 38 to be swung back to its former full-line position, thereby causing the motor to lower the lure arm and bring the lure to its lower position.

The hurdling switch 36 may also be so interlocked with the movement of the arm 26, by providing another lever 57 indicated by dotted lines in Fig. 3, as to cause the switch 36 to be thrown to its dotted line position whenever the lure arm 26 has reached its downward full line position shown in Fig. 1. With such arrangement the lure arm will continuously be moving from the position near the ground to a somewhat raised position, the lure thereby being caused to exercise a continuous jumping movement as the carriage is moving along the track.

The invention is not limited to the particular type of lure carriage or to the constructional details and circuit arrangements specifically described hereinabove but will suggest to those skilled in the art many other modifications. It is accordingly desired that the appended claims be given a broad construction within the scope of the art.

I claim:

1. In a dog racing apparatus comprising a racing course, a rail track along said course and an electrically propelled carriage on said rail track, a lure supported by said carriage, a reversible electric motor for moving said lure towards and away from said course, energizing circuits for said motor, and switching means for causing said motor to rotate in one direction for lifting said lure and to rotate in the opposite direction to lower said lure.

2. In a dog racing apparatus comprising a racing course, a rail track along said course and an electrically propelled lure carriage on said rail track, a lure-lifting mechanism on said carriage comprising a lure arm supported on the carriage, a lure carried on said arm, a reversible electric driving motor, a power transmission mechanism between said motor and said lure arm for causing said motor to move the lure towards and away from said course, energizing circuits for said motor and switching means for controlling said energizing circuits to produce rotation of the motor in one or the other action.

3. In a dog racing apparatus, a racing course, a rail track disposed along said course, an electrically propelled lure carriage on said rail track, and a lure mechanism on said carriage, said lure mechanism comprising a lure arm, a lure carried by said arm, a reversible electric driving motor, and a nonreversible power transmission between said motor and said arm whereby rotation of the motor in one direction causes said arm to move towards said course and rotation of said motor in the opposite direction causes said arm to move away from said course, energizing circuits for said motor and switching means for controlling said energizing circuits to produce rotation of the motor in either one or the other direction.

4. In a dog racing apparatus, a racing course, a rail track disposed along said course, an electrically propelled lure carriage on said rail track, and a lure mechanism on said carriage, said lure mechanism comprising a lure arm, a lure carried by said arm, a reversible electric driving motor, and a nonreversible power transmission between said motor and said arm whereby rotation of the motor in one direction causes said arm to move towards said course and rotation of said motor in the opposite direction causes said arm to move away from said course, energizing circuits for said motor, switching means for controlling said energizing circuits to produce rotation of the motor in either one or the other direction and a cam disposed along said course for actuating said switching means to reverse the direction of the rotation of said motor.

5. In a dog racing apparatus, a racing course, a rail track disposed along said course, a lure carriage on said rail track and a lure mechanism on said carriage comprising a reversible electric motor, a lure supported by said carriage and arranged to be moved by said motor either away or towards said course, energizing circuits for said motor to cause rotation thereof in either one or the opposite direction for moving said lure away and towards the course, respectively, switching means for establishing energizing connections to produce rotation of the motor in either one or the opposite direction, said switching means being responsive to the movement of said lure to cause reversal of the direction of the movement of said lure upon reaching a predetermined position.

6. In a dog racing apparatus, a racing course, a rail track disposed along said course, a rail carriage on said rail track, and a lure mechanism on said carriage comprising a reversible electric motor, energizing circuits for the motor, a control switch for said energizing circuits, said control switch being arranged to vary the energization of said motor to cause rotations thereof in either one or the opposite direction, a lure supported on said carriage and a mechanism operated by said motor to cause said lure to move towards said course when the motor is rotating in one direction and to move away from said course when the motor is rotating in the opposite direction, a cam disposed along said course for actuating said switching means to produce a reversal of the direction of rotation of the motor, and means actuated by said lure propelling mechanism to cause reversal of the direction of rotation of said motor.

7. In a dog racing apparatus comprising a racing course and a rail track disposed along said course, a lure carriage adapted to be propelled on said rail track, a lure arm supported on said carriage, a lure carried by said arm, a reversible electric motor, a unidirectional power transmission mechanism between said motor and said arm for causing said arm to move said lure away from said track upon rotation of the motor in one direction and to move said lure towards the track upon rotation of the motor in opposite direction, a switch for establishing energizing connections to said motor to cause rotations thereof in either one or in the opposite direction, and means responsive to the movement of said lure arm for actuating said switch to reverse the direction of rotation of said motor.

8. In a dog racing apparatus comprising a racing course and a rail track disposed along said course, a lure carriage adapted to be propelled on said rail track, a lure arm supported on said carriage, a lure carried by said arm, a reversible electric motor, a unidirectional power transmission mechanism between said motor and said arm for causing said arm to move said lure away from said track upon rotation of the motor in one direction and to move said lure towards the track upon rotation of the motor in opposite direction, a switch for establishing energizing connections to said motor to cause rotations thereof in either one or in the opposite direction, means responsive to the movement of said lure arm for actuating said switch to reverse the direction of rotation of said motor, and additional means disposed along said track for independently controlling said switching means to produce reversal of the direction of rotation of said motor in response to passing of said carriage over a predetermined point on said track.

In testimony whereof I have hereunto subscribed my name this 23 day of September, A. D. 1927.

SOLOMON M. PINELES.